United States Patent
Oliveira et al.

(10) Patent No.: US 12,160,355 B2
(45) Date of Patent: Dec. 3, 2024

(54) NETWORK MONITORING AGENT HUBS

(71) Applicant: Cisco Technology, Inc., San Jose, CA (US)

(72) Inventors: Ricardo V. Oliveira, San Francisco, CA (US); Arash Molavi Kakhki, San Francisco, CA (US); Prabhnit Singh, El Dorado Hills, CA (US); Cameron Esdaile, Crows Nest (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/877,424

(22) Filed: Jul. 29, 2022

(65) Prior Publication Data
US 2023/0034229 A1    Feb. 2, 2023

Related U.S. Application Data

(60) Provisional application No. 63/227,967, filed on Jul. 30, 2021.

(51) Int. Cl.
*H04L 43/045*    (2022.01)
*H04L 43/08*    (2022.01)
*H04L 43/087*    (2022.01)
*H04L 43/50*    (2022.01)

(52) U.S. Cl.
CPC ............ *H04L 43/045* (2013.01); *H04L 43/08* (2013.01); *H04L 43/087* (2013.01); *H04L 43/50* (2013.01)

(58) Field of Classification Search
CPC ..... H04L 43/045; H04L 43/087; H04L 43/50; H04L 43/0858; H04L 43/0894; H04L 43/08
See application file for complete search history.

(56) References Cited

U.S. PATENT DOCUMENTS

| | | | |
|---|---|---|---|
| 8,989,199 B1 * | 3/2015 | Sella | H04L 45/72 370/395.31 |
| 9,924,518 B2 | 3/2018 | Yi et al. | |
| 10,057,084 B2 | 8/2018 | Mithyantha et al. | |
| 10,728,135 B2 * | 7/2020 | Raney | H04L 67/34 |
| 10,848,403 B1 | 11/2020 | Schroeder | |

(Continued)

FOREIGN PATENT DOCUMENTS

| | | | | |
|---|---|---|---|---|
| CN | 106209825 A | * | 12/2016 | ........... H04L 41/145 |
| CN | 113098733 A | * | 7/2021 | ............ H04L 43/50 |

*Primary Examiner* — Rachel J Hackenberg
(74) *Attorney, Agent, or Firm* — BEHMKE INNOVATION GROUP LLC; James M. Behmke; James J. Wong

(57) ABSTRACT

In one embodiment, a method comprises: establishing, from an agent hub device, a tunnel to a remote vantage point device; generating, by the agent hub device, test traffic to appear as though the test traffic originates from the remote vantage point device; encapsulating, by the agent hub device, the test traffic into the tunnel to the remote vantage point device to cause the remote vantage point device to decapsulate the test traffic and send the test traffic as though the test traffic originated from the remote vantage point device; receiving, at the agent hub device, one or more returned test responses in response to the test traffic; and producing, by the agent hub device, test results based on the one or more returned test responses.

19 Claims, 9 Drawing Sheets

(56) References Cited

U.S. PATENT DOCUMENTS

| | | | |
|---|---|---|---|
| 2005/0094567 A1* | 5/2005 | Kannan | H04L 43/50 |
| | | | 370/241 |
| 2006/0029064 A1* | 2/2006 | Rao | H04L 61/2557 |
| | | | 370/389 |
| 2015/0103679 A1* | 4/2015 | Tessmer | H04L 43/10 |
| | | | 370/252 |
| 2021/0126843 A1 | 4/2021 | Dam et al. | |
| 2021/0126860 A1 | 4/2021 | Ramaswamy et al. | |
| 2022/0329510 A1* | 10/2022 | Barrett | H04L 43/55 |

* cited by examiner

NETWORK MONITORING AGENT HUBS

RELATED APPLICATION

This application claims priority to U.S. Provisional Appl. Ser. No. 63/227,967, filed Jul. 30, 2021, entitled NETWORK MONITORING AGENT HUBS, by Oliveira, et al., the contents of which are incorporated herein by reference in its entirety.

TECHNICAL FIELD

The present disclosure relates generally to computer systems, and, more particularly, to network monitoring agent hubs.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, network monitoring solutions are currently available that allow customers to monitor resources that impact performance of the customers' applications, services, etc. Visibility into such resources may be based on a suite of "agents" or pieces of software that are installed in different locations and devices in different computer and/or communications networks (e.g. around the world). Generally, however, it is difficult to expand the agent deployment base across certain customers in order to fully run the tests that they need, and there have been no scalable and straightforward ways to deploy agents across their numerous diverse sites and/or at resource-limited sites.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, the techniques herein are directed toward network monitoring agent hubs.

Many customers are not able to install an agent (e.g., enterprise agent) on every branch they want to monitor, either because they don't have the hardware/resources, or they can't justify the effort of doing that. The techniques herein solve that problem by providing a more centralized way of doing monitoring via "agent hubs", which can reduce dramatically the number of required agent installations that customers need to do (e.g., potentially down to zero customer installations).

Specifically, according to one or more embodiments of the disclosure, an example method herein comprises: establishing, from an agent hub device, a tunnel to a remote vantage point device; generating, by the agent hub device, test traffic to appear as though the test traffic originates from the remote vantage point device; encapsulating, by the agent hub device, the test traffic into the tunnel to the remote vantage point device to cause the remote vantage point device to decapsulate the test traffic and send the test traffic as though the test traffic originated from the remote vantage point device; receiving, at the agent hub device, one or more returned test responses in response to the test traffic; and producing, by the agent hub device, test results based on the one or more returned test responses.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
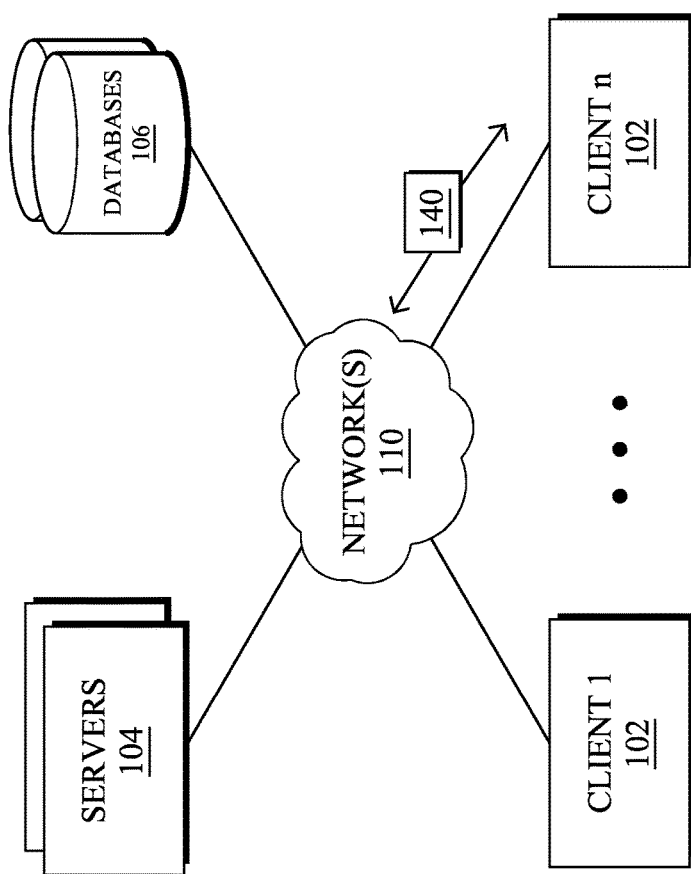
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
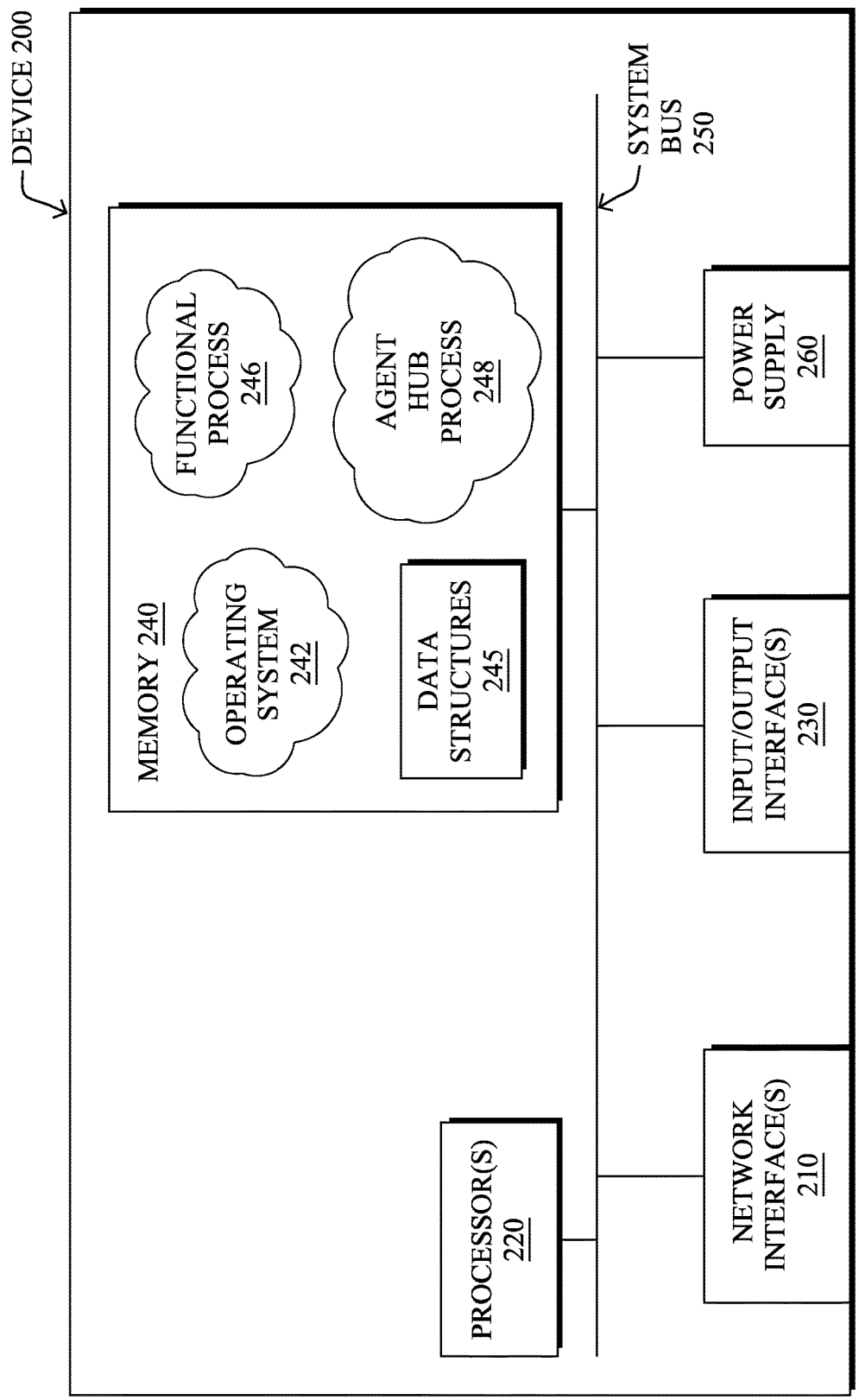
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, for example, wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative agent hub process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming, if not impossible (e.g., for a mere user of the SaaS service). For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and end point agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
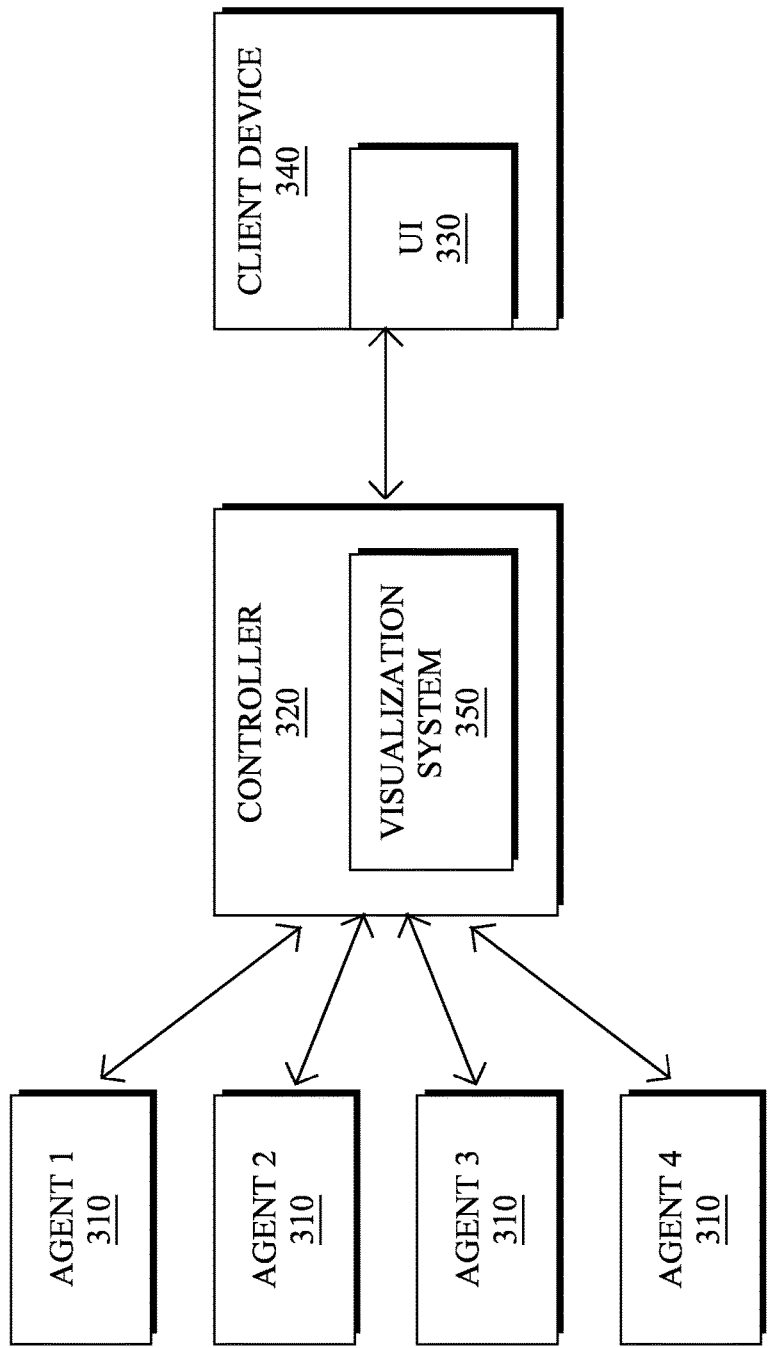
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controller 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controller 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, or a datacenter at the core of the edge of a network, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Network Monitoring Agent Hubs

As noted above, network monitoring solutions are currently available that allow customers to monitor networks and applications that, while not necessarily under the control, management, operation, etc. of the customers, still impact performance of the customers' applications, services, etc. Visibility into such resources may be based on a suite of "agents" or pieces of software that are installed in different locations and devices in different computer and/or communications networks (e.g. around the world).

Examples of different agents, as described herein above, may comprise: a) cloud agents (e.g., deployed and maintained by the network monitoring solution provider), b) enterprise agents (e.g., installed and operated in a customer's network), and c) end point agents, which may be a different version of the previous agents that is installed on actual users' (e.g., employees') devices (e.g., on their web browsers or otherwise). Each of these agents may be configured to run tests from their respective devices, where the tests allow a customer to customize from a suite of tests against different networks and applications or any resource that they are interested in having visibility into. For example, a given test may offer provide visibility into one or more resources of a particular end point (e.g., at a "layer" where the test is being performed). Alternatively, a test may provide visibility into what is in between the end point and another component, for example, how a device is specifically connected through a network to an end resource (e.g., full visibility at various and multiple layers). In operation, essentially, when a customer uses one or more agents to run tests, probe packets travel through the Internet, go through many different networks, measure/monitor a given metric, component, etc., and the network monitoring solution gathers all of that data (e.g., from returned packets, responses, and so on, or, particularly, a lack thereof).

The tests that a given agent performs may comprise HTTP tests (e.g., using curl to connect to a server and load the main document served at the target), Page Load tests (e.g., using a browser to load a full page, in other words, the main document along with all other components that are included in the page), or Transaction tests (e.g., like Page Load test but also performing multiple tasks/steps within given page like, load a shopping website, log in, search for an item, add it to the shopping cart, etc.).

In general, when customers need the visibility described above, they first need to deploy the agents in their network. Assume, however, that a customer has 1000 sites, then they ideally want visibility from those 1000 sites, and thus would need to have an agent deployed across all 1000 sites. Today, however, due to the amount of work involved, the limited amount of space/resources, and so on, many customers resort to deploying agents to only 10-20% of their sites. This is especially true for small to medium sized customer who often have very little hardware to host agents because they want to minimize as much hardware at their retail sites as possible (e.g., to reduce management difficulty).

Notably, due to limited resources (e.g., hardware space, minimal IT support, etc.), many customers resort to deploying agents to only a fraction of their sites. Accordingly, as noted above, it is difficult to expand the agent deployment base across certain customers in order to fully run the tests that they need, as there is no scalable and straightforward way to deploy agents across their numerous diverse sites and/or at resource-limited sites.

The techniques herein, however, address this by providing network monitoring agent "hubs", essentially allowing an "agentless" way of measuring performance from origination points (e.g., branch offices, endpoints, etc.) without needing to install agents locally. In this manner, customers can achieve the desired visibility from every site that they need to monitor.

Figure 4A:
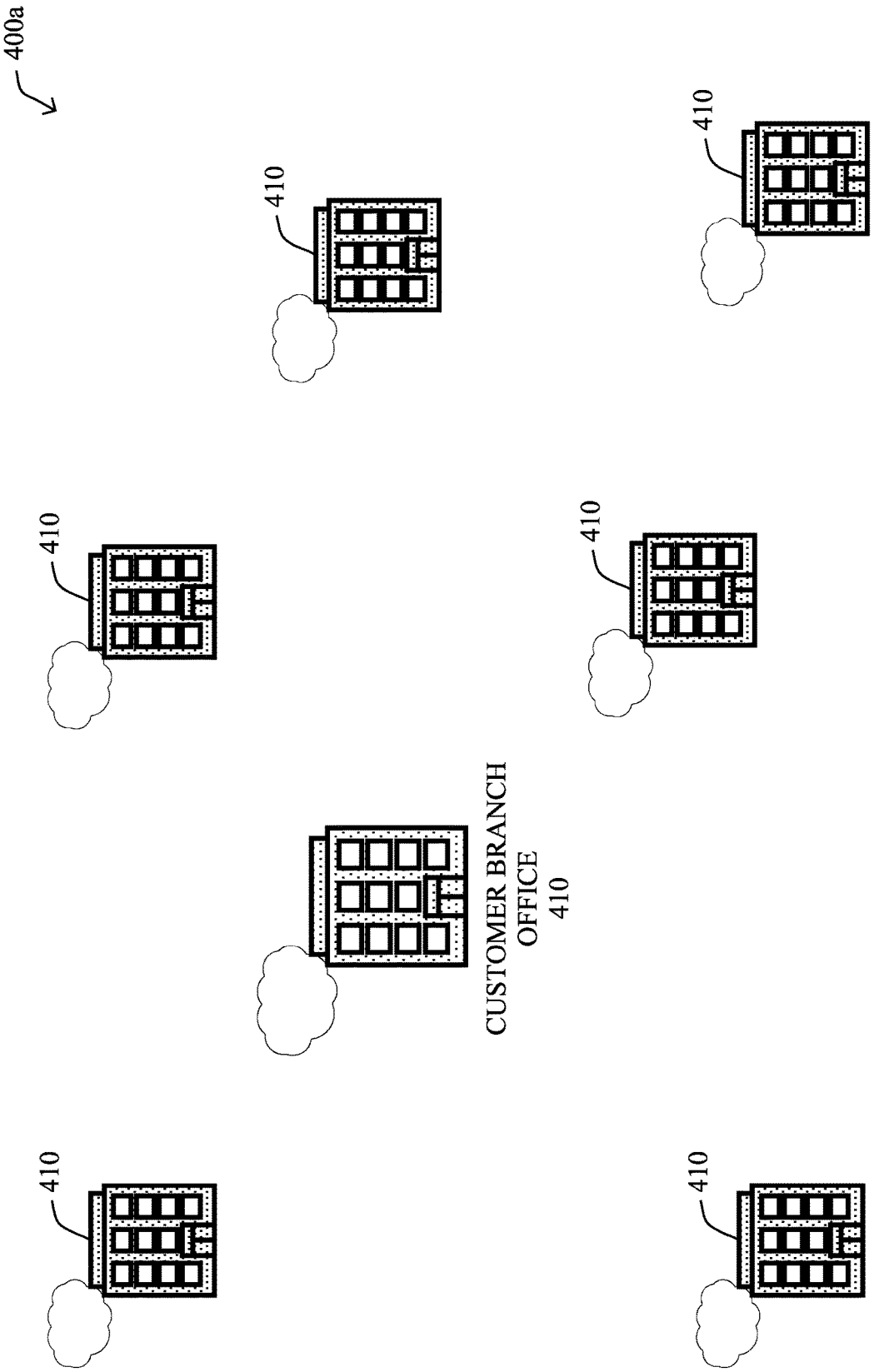
FIGS. 4A-4B illustrate an example branch office and agent hub configuration.

As an illustration, assume as shown in example 400*a* of FIG. 4A that a customer has a number of distributed branch offices 410. Now assume that the customer is interested in monitoring application performance from their sites, but has no way of deploying an agent at one or more particular site (e.g., a Denver site).

According to the techniques herein, a different agent can be used in place of any agent at that particular site. For example, assume that a network monitoring platform already has a cloud agent deployed near this particular site (e.g., in Denver). (Note that "near" is a relative term discussed further below.) That is, this is a site that the monitoring platform (or the customer enterprise) owns, and there may already be agents deployed there or there may be more availability to place an agent there.

Figure 4B:
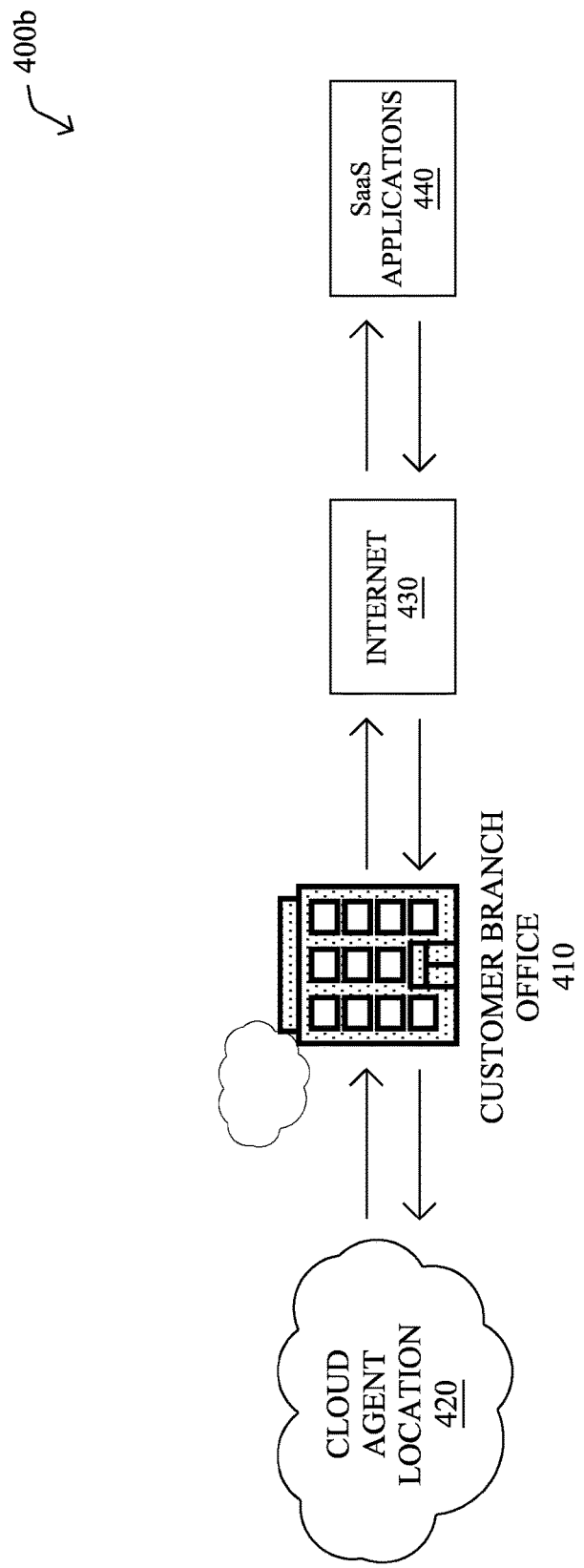

As seen in example 400b of FIG. 4B, for instance, the nearby cloud agent 420 (or enterprise agent) may thus be used to send the test traffic through the branch 410 and then out into the Internet 430 to wherever the test (e.g., probes, packets, etc.) need to go so that they can get the visibility from the branch that they need (e.g., to one or more SaaS applications 440). In this manner, the agent deployed remoted from the actual starting point (e.g., the branch office) is thus an "agent hub", according to the techniques herein, and as described in greater detail below.

Said differently, the techniques herein deploy managed cloud or enterprise agents in hub sites (an "agent hub") and establish tunnels (e.g., IPSEC VPN tunnels) between the cloud agents or enterprise agents and the customer routers/VPN termination points. This termination point can be an SDWAN device that terminates the tunnel coming from the agent hub. The tunnel latency should be low (e.g. <10 ms or 80 km) and have enough bandwidth to perform the tests.

As an example, within North America and western Europe, where a lot of the world's largest retail sites are located, 80-90% of the major enterprise locations are located within 10 milliseconds of a major cloud provider.

A "hub", therefore, is an origin of test traffic (e.g., start of VPN tunnel), whereas a "vantage point" (VP) refers to the simulated origin of traffic (e.g., termination of VPN tunnel), such as the branch office, remote site, etc. In particular, according to the techniques herein, an agent hub (e.g., managed by the monitoring platform or the enterprise) may establish a tunnel (e.g., an IPSec tunnel) to a vantage point/customer branch (e.g., a few configuration settings, as will be understood by those skilled in the art) so that the agent hub can use that tunnel to send test traffic (e.g., probe packets) through that vantage point (e.g., branch), at which time it is de-tunneled (e.g., decapsulated) and sent out to the Internet according to the test, as though it originated at the vantage point, accordingly.

In this manner, a customer with multiple diverse branch locations, such as San Francisco, London, and Austin, can utilize agent hubs in correspondingly close locations (e.g., also in San Francisco, London, and Austin, respectively), and then when tests are run by those nearby agent hubs through those individual vantage points, the tests are essentially producing results relevant to the individual locations as if they were actually originated by the branch locations.

Figure 5:
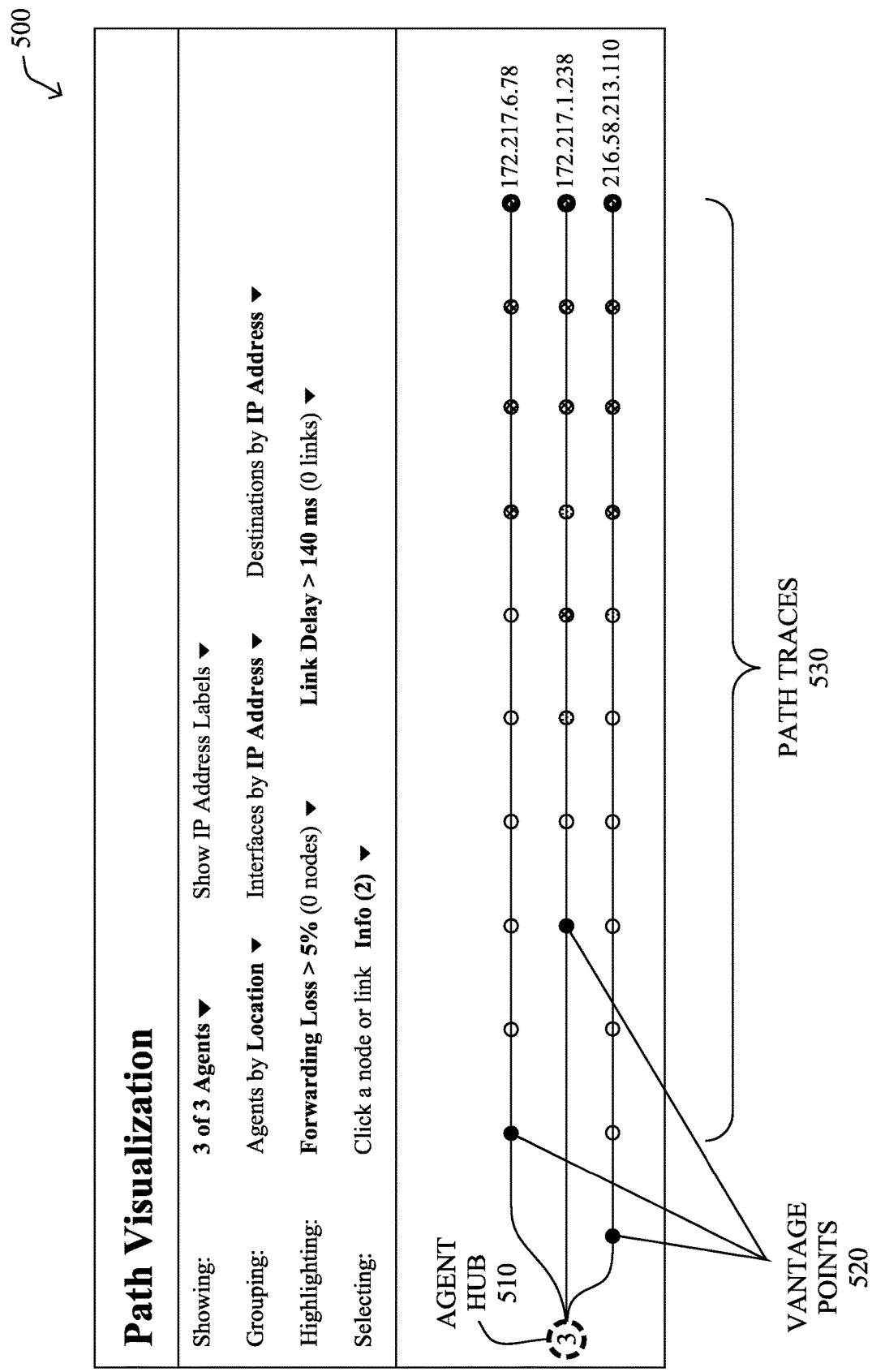
FIG. 5 illustrates an example of a path visualization based on agent hubs.

Note too, that as shown in graphical visualization 500 of FIG. 5 (e.g., a monitoring GUI), a single agent hub 510 can be the originator agent for a plurality of respective vantage points 520. For example a single Chicago hub may be used for multiple branch tests for customer offices located near that Chicago hub, and three separate path traces 530 (and associated metrics) may be obtained, accordingly.

Figure 6A:
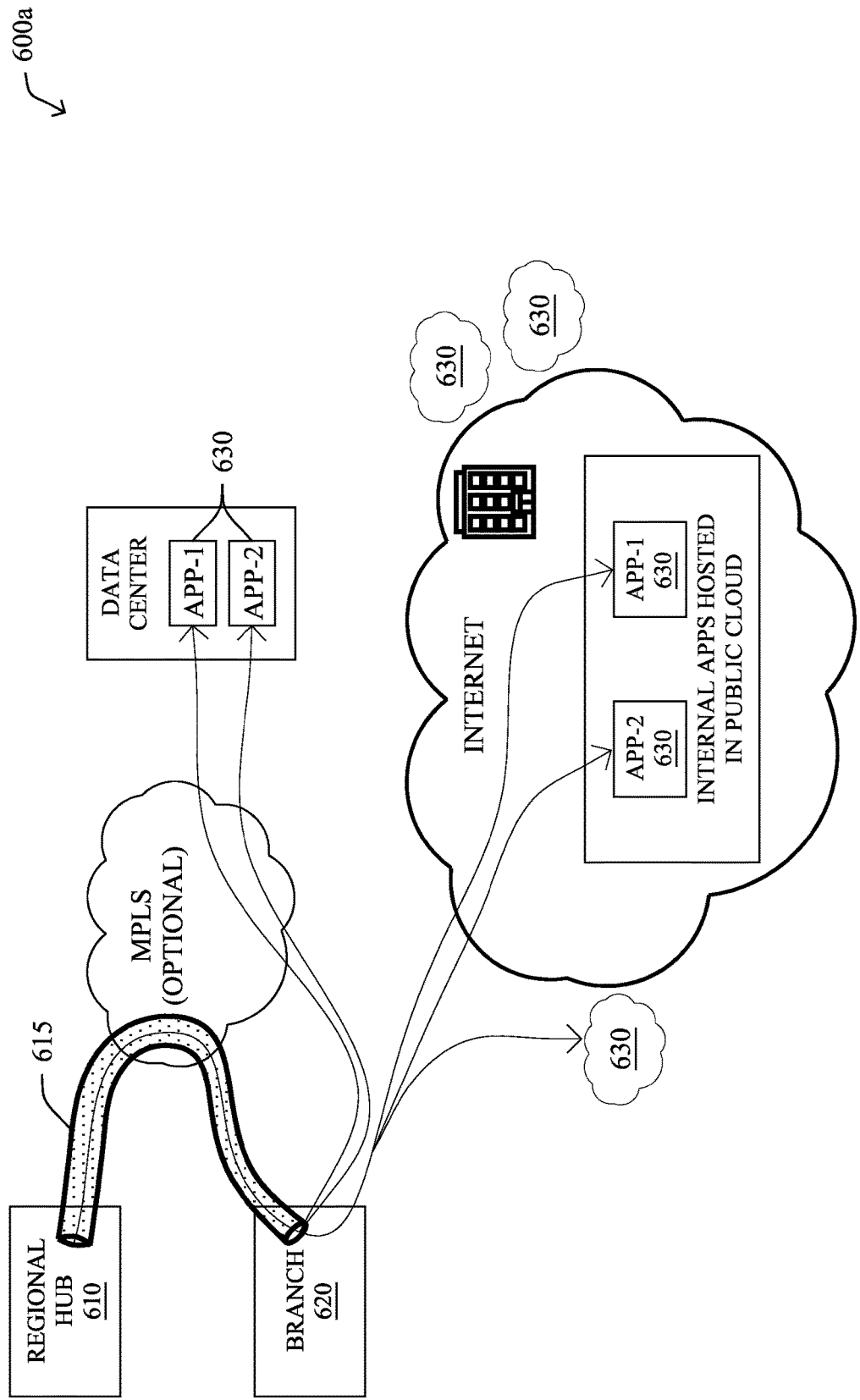
FIGS. 6A-6B illustrate additional example branch office and agent hub configurations.
Figure 6B:
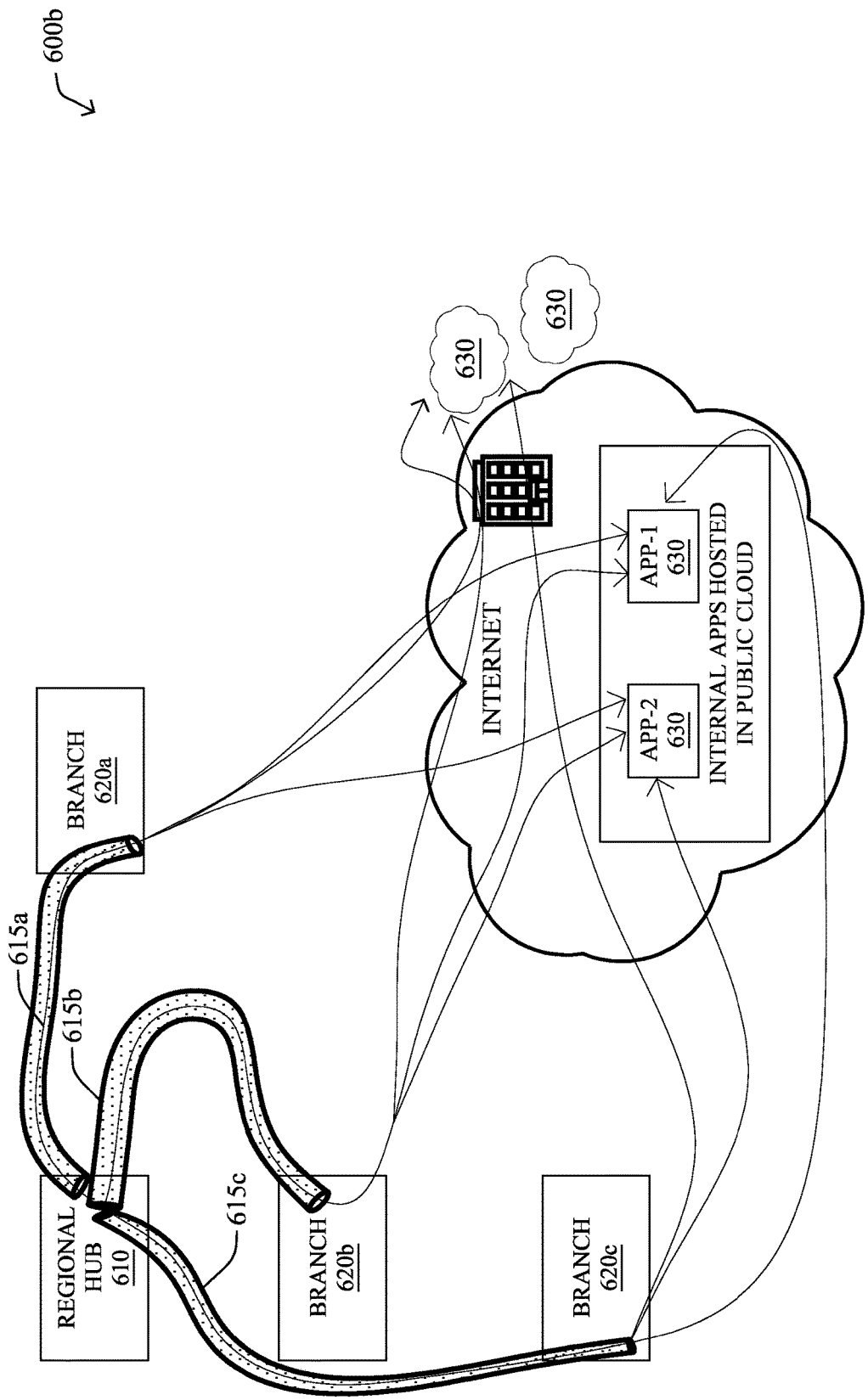

Said differently, the techniques herein can support two different types of deployment: a single agent hub acting on behalf of a single vantage point, or a single agent hub originating tests through a plurality of different vantage points. For example, FIGS. 6A-6B illustrate examples of each of these types of deployments, respectively. Namely, example 600a of FIG. 6A shows an agent hub 610 communicating with a single branch 620 (via a tunnel 615, e.g., an IPSEC tunnel with a default route from the agent hub pointing to an interface on a branch router), which then proceeds to test a number of Applications 630 (e.g., data center apps, internal apps hosted in a public cloud, other third-party apps, etc.). Examples of tests that can be performed can produce various QoE/User Experience Metrics, such as response time (application layer) and download speeds, service availability and HTTP errors (application layer), connect time (application layer), wait time (application layer), download speed/HTTP throughput, end-to-end network latency and packet loss, and so on. Conversely, as shown in example 600b of FIG. 6B, an agent hub 610 communicates with a plurality of branches 620a-c (via a tunnels 615a-c, e.g., IPSEC tunnels from the agent hub directly to each respective branch router), which then also proceeds to test a number of Applications 630 from each respective branch. To select the particular branch from which to run a test, the techniques herein may thus select a corresponding tunnel onto which the test traffic should be sent, accordingly.

According to one or more of the embodiments herein, there are also two example models of hub types: Enterprise Hubs ("on-prem" enterprise agent hubs) and Cloud hubs ("Managed" enterprise agent hubs). Specifically, an enterprise hub is deployed on-premises of an enterprise and is managed by the customer. This first option can be a low friction option for customers that don't want to do a direct connect to IaaS. Notably, it requires at least one enterprise agent deployment at some enterprise site and the customer needs to ensure that the/each agent hub is close enough from the branches they want to monitor. That is, agents are deployed in the customer's own hub sites, where VPNs/tunnels are used to send traffic through to satellite branches, in order to minimize the agent deployment footprint of the customer. This option provides better compliance with security protocols (e.g., for banks, etc.) where control must be maintained by the enterprise itself, but while still providing better scalability than individualized branch-based enterprise agents.

Conversely, a cloud hub is deployed in the IaaS/Cloud and is managed by the network monitoring platform. This option can be configured as dedicated instances per customer (e.g., as a cloud computing resource), and could cover a large portion of the locations where enterprise agents are generally deployed. This option, in particular, requires no software installation at the customer site, except configuration to be a tunnel end point.

Regarding tunnel establishment (e.g., L3 tunnel establishment), the choice of tunneling technology will largely depend on the support on the VP branch gateway. Common protocols include GRE and IPSec, but others may be used. Regardless of VPN technology in use the VP branch gateway will require configuration of a public IP address of the target Hub location, and the test traffic traversing the VPN from the Hub to the VP branch gateway will need to have a source IP Network Address Translation (NAT) Masquerade applied to ensure the traffic exits the VP gateway as expected. This should avoid the need for any source IP or source interface based policy routing requirements.

The introduction of IPSec based tunneling would add these additional requirements:

Configuration and management of a shared secret on both Hub and VP gateway infrastructure. An alternative could be to leverage PKI based certificates for the key material but this could again be gated by support on the VP gateway.

Coordination of VP Gateway support and subsequent configuration of IKE protocol versions and ESP cipher suites used for payload encryption.

There are also a number of routing and multi-tenancy considerations in the Hub location. For instance, assuming a Cloud hub location is going to support multiple Agent Hub customers, there is a need to consider the multi-tenancy aspects of the Cloud Hub routing topology. That is, there may be a potential for overlapping inside IP address ranges from the VPN configurations, and consideration should be made for handling of default route configuration from the source Cloud Hub agent initiating tests whilst still maintaining VPN connectivity. Options available herein to address these challenges include: a) a lightweight ephemeral VPN container and leverage k8s namespaces to create customer specific routing path; and b) embedding VPN configuration directly within existing agent container and mandate customer specific agents.

Furthermore, maximum transmission unit (MTU) considerations need to be taken into account with the introduction of these VPN technologies for traffic management, as well. ICMP-based Path MTU Discovery will likely be impacted by the tunnel between the Cloud Hub and VP gateway and hence could impact any subsequent throughput measurements.

The techniques herein further provide considerations for how to handle DNS resolution, given any disparity of client locations. That is, ideally the DNS resolution should be seen as coming from the vantage point, not the Hub (i.e., you don't want to get a DNS resolution that depends on the location of the agent hub, rather than where the vantage point is supposed to be virtually running the test from). Since DNS test traffic should also be tunneled, consideration are made herein to make this work with browser tests. In order to accurately capture the same experience of users behind the branch gateway, DNS requests need to appear they are coming from the branch location to ensure any Global Server Load Balancing (GSLB) techniques deliver the most performant IP address resolution for that location (both real user traffic and synthetic test traffic from Hub location). Two optional approaches to handling this challenge are as follows:

Geo Target by DNS Resolver IP Address where the Cloud Hub agent would need to be configured with the same broadband DNS resolver as the one presented to the VP gateway. If the VP Gateway is serviced by multiple broadband providers for performance and redundancy purposes, however, this would prove challenging.

Geo Target by EDNS Client Subnet (ECS) where the Cloud Hub agent would need to be configured with an ECS compatible recursive DNS provider such as Google Public DNS (8.8.8.80, Cisco OpenDNS, Quad9 etc. This solution provides a more dynamic support for the multi broadband providers at the VP gateway location.

Regarding agent hub location selection (particularly a cloud hub, but also where multiple enterprise hubs are available), the techniques herein can select the best agent hub location given a particular vantage point. For example, as described in detail below, the techniques herein may measure the performance between the VP and the Hub (e.g., both directions), and based on an established minimum requirements of latency and bandwidth (e.g. 10 ms, 10 Mbps), may then associate (or disassociate) vantage points with a particular hub if the minimum requirements are met (or not met, respectively).

In greater detail, given a vantage point's ASN/IP address and geo coordinates, the techniques herein may apply the following example methodology to select appropriate agent hubs for that vantage point (VP), accordingly:

1. Create a Cloud Agent (CA) Pool={all CAs within THRESHOLD DISTANCE of the VP}
  If VP's accurate location is not available, any of the following can be used to create the initial pool:
    a. CA Pool={all CAs in the same country as the VP}
      i. Requires country level location for the VP
      ii. Must include neighboring countries in regions such as EMEA with many smaller countries
    b. CA Pool={all CAs in the same region as the VP}
      i. Requires region information for the VP (we can assume this is always available)
    c. CA Pool={all CAs within THRESHOLD_LATENCY of the VP}
2. From each CA in CA Pool, calculate the following metrics:
    a. Latency to VP
    b. Bandwidth to VP
    c. #AS hops to VP
    d. #hops to VP
3. Filter out CAs that do not satisfy any of the following thresholds:
    a. THRESHOLD_LATENCY
    b. THRESHOLD_JITTER
    c. THRESHOLD_BANDWIDTH
4. Sort the remaining CAs by the following (in order):
    a. Latency to VP
    b. Bandwidth to VP
    c. #AS hops to VP
    d. #hops to VP The output of this algorithm is the list of available hubs, sorted as generated in step 4 above. Notably, while emphasis is initially placed on latency, then bandwidth, and so on, other configurations herein may use different rankings of metrics or other characteristics, such as for load balancing, packet drops, and so on, and those shown above are merely one example implementation.

In one embodiment herein, the list of available hubs may be updated occasionally (e.g., every hour or every few hours). This can either be done for only the current list, and/or redone for the full CA pool in case the size of the available hubs list falls below a threshold. In particular, the techniques herein may constantly monitor the metric in step 2 above for selected hubs, and may act accordingly if the metrics fall below acceptable thresholds, such as, for example:

Threshold Distance—50 miles
Threshold Latency—10 ms
Threshold Jitter—5 ms
Threshold Bandwidth—10 Mbps As such, keeping an up-to-date list of available hubs is essential for this operation.

In addition to these metrics, other possibilities include maintaining an agent health/reliability score (e.g., based on jitter, loss, etc.) and removing (or even blacklisting) unreliable agents from consideration as hubs.

Given that the techniques herein add a tunnel leg between the agent hub and the desired vantage point, reporting of hub tests results may involve treating VP-based reports as special agents whenever possible, e.g., taking end-to-end results at face value given there is a minimum requirement of latency.

However, while the above techniques are generally suitable for a majority of tests, given the tight tolerances of latency, jitter, loss, etc., some tests still require greater accuracy and control, and other considerations may be made herein, accordingly. For example, additional metrics may be monitored across the tunnel in particular, and such tunnels may be correspondingly removed from the total metric of the tests. For example, if the latency from the agent hub to the vantage point tunnel end is measured as 5 ms, that ms may be removed from the total end-to-end latency result of any tests (e.g., single-direction tests, or x2 for round trip tests). Other techniques may further be used herein to dampen any effects from the tunnel leg/hop, such as loss, jitter, etc., and variously accommodations may be made accordingly. (Also note that these considerations are only applicable where the vantage point can participate in the local metric measurement, such as being configured to reply to ICMP messages, etc., otherwise the "nearby agent hub" solution with minimums are likely a sufficient and acceptable solution.)

Advantageously, the techniques herein provide network monitoring agent hubs, thus removing barriers to agent deployment. In particular, agent hub techniques proposed herein remove the friction of installed agents at customer sites (e.g., smaller branches, retail locations, etc.), such as where there is not the required hardware or expertise to install agents.

Figure 7:
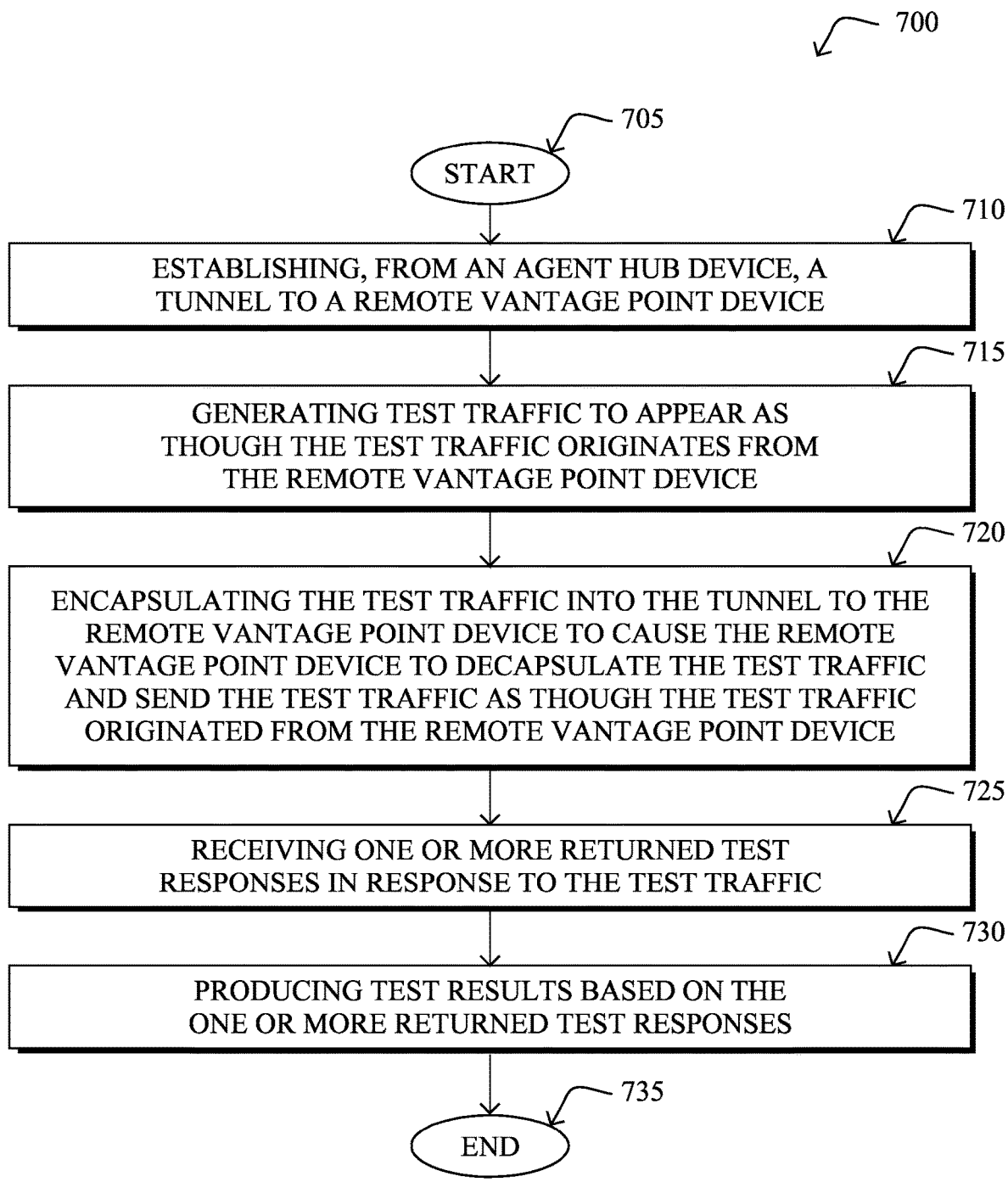
FIG. 7 illustrates an example simplified procedure for network monitoring agent hubs in accordance with one or more embodiments described herein.

In closing, FIG. 7 illustrates an example simplified procedure for network monitoring agent hubs in accordance with one or more embodiments described herein. For example, a non-generic, specifically configured device (e.g., device 200, particularly an agent hub device) may perform procedure 700 by executing stored instructions (e.g., process 248). The agent hub device (e.g., a cloud agent or an enterprise agent), may have been selected from a plurality of options based on one or more measured metrics between the agent hub device and the remote vantage point device (e.g., geographical distance, latency, bandwidth, number of AS hops, number of hops, jitter, etc.), and/or may have been selected based on one or more performance minimums between the agent hub device and the remote vantage point device.

The procedure 700 may start at step 705, and continues to step 710, where, as described in greater detail above, the agent hub device establishes a tunnel to a remote vantage point device (e.g., an IPSec VPN tunnel).

In step 715, the agent hub device may then begin generating test traffic (e.g., probe traffic to one or more applications) to appear as though the test traffic originates from the remote vantage point device. As described above, this may be based on setting a source address of the test traffic to be a source address of the remote vantage point device, and/or applying an IP NAT Masquerade to the test traffic. Also, it may be necessary to manage DNS operations to appear to originate from the remote vantage point device.

In step 720, the agent hub device may then encapsulate the test traffic into the tunnel to the remote vantage point device to cause the remote vantage point device to decapsulate the test traffic and send the test traffic as though the test traffic originated from the remote vantage point device, as described in detail above.

Accordingly, in step 725, the agent hub device may receive one or more returned test responses in response to the test traffic, and in step 730 may produce test results based on the one or more returned test responses. Notably, in certain embodiments, the techniques herein may also remove effects of the tunnel from the test results, such as by measuring the effects of the tunnel as part of the test traffic, or else by using a pre-determined measurement of the effects of the tunnel for all test traffic (e.g., based on initial measurements made to select the agent hub device in the first place, or otherwise).

The procedure 700 may then end in step 735, notably with the ability to continue ingesting and processing data. Other steps may also be included generally within procedure 700, such as to operate as an agent hub device for a plurality of remote vantage point devices, and so on.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, the techniques described herein may be performed by hardware, software, and/or firmware, such as in accordance with the illustrative agent hub process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: establishing, from an agent hub device, a tunnel to a remote vantage point device; generating, by the agent hub device, test traffic to appear as though the test traffic originates from the remote vantage point device; encapsulating, by the agent hub device, the test traffic into the tunnel to the remote vantage point device to cause the remote vantage point device to decapsulate the test traffic and send the test traffic as though the test traffic originated from the remote vantage point device; receiving, at the agent hub device, one or more returned test responses in response to the test traffic; and producing, by the agent hub device, test results based on the one or more returned test responses.

In one embodiment, generating test traffic to appear as though the test traffic originates from the remote vantage point device comprises: setting a source address of the test traffic to be a source address of the remote vantage point device. In one embodiment, the method further comprises: applying an Internet Protocol Network Address Translation Masquerade to the test traffic.

In one embodiment, the method further comprises: managing domain name service operations to appear to originate from the remote vantage point device.

In one embodiment, the method further comprises: removing effects of the tunnel from the test results. In one embodiment, the method further comprises: measuring the effects of the tunnel as part of the test traffic. In one embodiment, the method further comprises: using a pre-determined measurement of the effects of the tunnel for all test traffic.

In one embodiment, the agent hub device is selected from a plurality of options based on one or more measured metrics between the agent hub device and the remote vantage point device. In one embodiment, the one or more measured metrics are selected from a group consisting of: geographical distance; latency; bandwidth; number of autonomous system hops; number of hops; and jitter.

In one embodiment, the agent hub device is selected based on one or more performance minimums between the agent hub device and the remote vantage point device.

In one embodiment, the tunnel is an Internet Protocol Security Virtual Private Network tunnel.

In one embodiment, the test traffic comprises probe traffic to one or more applications.

In one embodiment, the method further comprises: operating as an agent hub device for a plurality of remote vantage point devices.

In one embodiment, the agent hub device is one of either a cloud agent or an enterprise agent.

According to the embodiments herein, an illustrative tangible, non-transitory, computer-readable medium herein may have computer-executable instructions stored thereon that, when executed by a processor on a device, may cause the device to perform a method comprising: establishing, as an agent hub device, a tunnel to a remote vantage point device; generating test traffic to appear as though the test traffic originates from the remote vantage point device; encapsulating the test traffic into the tunnel to the remote vantage point device to cause the remote vantage point device to decapsulate the test traffic and send the test traffic as though the test traffic originated from the remote vantage point device; receiving one or more returned test responses in response to the test traffic; and producing test results based on the one or more returned test responses.

Further, according to the embodiments herein an illustrative apparatus herein may comprise: one or more network interfaces to communicate with a network; a processor coupled to the network interfaces and configured to execute one or more processes; and a memory configured to store a process executable by the processor, the process, when executed, configured to: establish, as an agent hub device, a tunnel to a remote vantage point device; generate test traffic to appear as though the test traffic originates from the remote vantage point device; encapsulate the test traffic into the tunnel to the remote vantage point device to cause the remote vantage point device to decapsulate the test traffic and send the test traffic as though the test traffic originated from the remote vantage point device; receive one or more returned test responses in response to the test traffic; and produce test results based on the one or more returned test responses.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the network/application intelligence platform (e.g., application agents, network agents, enterprise agents, cloud agents, endpoint agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents, the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:
1. A method, comprising:
  establishing, from an agent hub device that operates as a cloud agent or enterprise agent on behalf of a plurality of remote vantage point devices, a virtual private network (VPN) tunnel to a remote vantage point device of the plurality of remote vantage point devices;

generating, by the agent hub device, test traffic to appear as though the test traffic originates from the remote vantage point device, where the test traffic is associated with a test from the cloud agent or enterprise agent;

encapsulating, by the agent hub device, the test traffic into the VPN tunnel to the remote vantage point device to cause the remote vantage point device to decapsulate the test traffic and send the test traffic to one or more Internet devices as though the test traffic originated from the remote vantage point device;

receiving, at the agent hub device and from the one or more Internet devices, one or more returned test responses in response to the test traffic; and producing, by the agent hub device, test results based on the one or more returned test responses.

2. The method as in claim 1, wherein generating the test traffic to appear as though the test traffic originates from the remote vantage point device comprises:

setting a source address of the test traffic to be a source address of the remote vantage point device.

3. The method as in claim 1, further comprising:

managing domain name service operations to appear to originate from the remote vantage point device.

4. The method as in claim 1, further comprising:

removing effects of the VPN tunnel from the test results.

5. The method as in claim 4, further comprising:

measuring the effects of the VPN tunnel as part of the test traffic.

6. The method as in claim 4, further comprising:

using a pre-determined measurement of the effects of the VPN tunnel for all test traffic.

7. The method as in claim 1, wherein the agent hub device is selected from a plurality of options based on one or more measured metrics between the agent hub device and the remote vantage point device.

8. The method as in claim 7, wherein the one or more measured metrics are selected from a group consisting of: geographical distance; latency; bandwidth; number of autonomous system hops; number of hops; and jitter.

9. The method as in claim 1, wherein the agent hub device is selected based on one or more performance minimums between the agent hub device and the remote vantage point device.

10. The method as in claim 1, wherein the tunnel is an Internet Protocol Security (IPsec) VPN tunnel.

11. The method as in claim 1, wherein the test traffic comprises probe traffic to one or more applications.

12. The method as in claim 1, wherein the agent hub device operates as a hub device for a plurality of remote vantage point devices including the remote vantage point device.

13. The method as in claim 1, wherein the agent hub device is a starting point of the VPN tunnel, and the remote vantage point device is a termination point of the VPN tunnel.

14. A tangible, non-transitory, computer-readable medium having computer-executable instructions stored thereon that, when executed by a processor on a computer, cause the computer to perform a method comprising:

establishing, as an agent hub device that operates as a cloud agent or enterprise agent on behalf of a plurality of remote vantage point devices, a virtual private network (VPN) tunnel to a remote vantage point device of the plurality of remote vantage point devices;

generating test traffic to appear as though the test traffic originates from the remote vantage point device by applying an Internet Protocol Network Address Translation Masquerade to the test traffic, where the test traffic is associated with a test from the cloud agent or enterprise agent by applying an Internet Protocol Network Address Translation Masquerade to the test traffic;

encapsulating the test traffic into the VPN tunnel to the remote vantage point device to cause the remote vantage point device to decapsulate the test traffic to one or more Internet devices as though the test traffic originated from the remote vantage point device;

receiving, from the one or more Internet devices, one or more returned test responses in response to the test traffic; and producing test results based on the one or more returned test responses.

15. The tangible, non-transitory, computer-readable medium as in claim 14, wherein generating the test traffic to appear as though the test traffic originates from the remote vantage point device comprises:

setting a source address of the test traffic to be a source address of the remote vantage point device.

16. The tangible, non-transitory, computer-readable medium as in claim 14, wherein the method further comprises:

managing domain name service operations to appear to originate from the remote vantage point device.

17. The tangible, non-transitory, computer-readable medium as in claim 14, wherein the method further comprises:

removing effects of the VPN tunnel from the test results.

18. The tangible, non-transitory, computer-readable medium as in claim 14, wherein the agent hub device is selected from a plurality of options based on one or more measured metrics between the agent hub device and the remote vantage point device.

19. An apparatus, comprising:

one or more network interfaces to communicate with a network;

a processor coupled to the one or more network interfaces and configured to execute one or more processes; and a memory configured to store a process that is executable by the processor, the process, when executed, configured to:

establish, as an agent hub device that operates as a cloud agent or enterprise agent on behalf of a plurality of remote vantage point devices, a virtual private network (VPN) tunnel to a remote vantage point device of the plurality of remote vantage point devices;

generate test traffic to appear as though the test traffic originates from the remote vantage point device, where the test traffic is associated with a test from the cloud agent or enterprise agent;

encapsulate the test traffic into the VPN tunnel to the remote vantage point device to cause the remote vantage point device to decapsulate the test traffic and send the test traffic to one or more Internet devices as though the test traffic originated from the remote vantage point device;

receive, from the one or more Internet devices, one or more returned test responses in response to the test traffic; and produce test results based on the one or more returned test responses.

* * * * *

UNITED STATES PATENT AND TRADEMARK OFFICE
CERTIFICATE OF CORRECTION

PATENT NO. : 12,160,355 B2
APPLICATION NO. : 17/877424
DATED : December 3, 2024
INVENTOR(S) : Ricardo V. Oliveira et al.

Page 1 of 1

It is certified that error appears in the above-identified patent and that said Letters Patent is hereby corrected as shown below:

In the Specification

Column 14, Line 9 please amend as shown:
THRESHOLD_DISTANCE of the VP}

Column 15, Line 12 please amend as shown:
the vantage point tunnel end is measured as 5 ms, that 5 ms Column 20, Lines 4-6 please amend as shown:
enterprise agent;

Signed and Sealed this
Eleventh Day of March, 2025

Coke Morgan Stewart
*Acting Director of the United States Patent and Trademark Office*